(12) United States Patent
Unrau et al.

(10) Patent No.: US 11,645,112 B2
(45) Date of Patent: *May 9, 2023

(54) SYSTEM AND METHODS FOR TRANSACTION-BASED PROCESS MANAGEMENT

(71) Applicant: Worldpay, LLC, Symmes Township, OH (US)

(72) Inventors: Jackson Andrew Unrau, Littleton, CO (US); Shawn Edward McCarthy, Commerce City, CO (US); Matthew Ray Cook, Parker, CO (US)

(73) Assignee: Worldpay, LLC, Symmes Township, OH (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/194,512

(22) Filed: Mar. 8, 2021

(65) Prior Publication Data

US 2021/0191767 A1 Jun. 24, 2021

Related U.S. Application Data

(63) Continuation of application No. 16/503,006, filed on Jul. 3, 2019, now Pat. No. 10,970,112, which is a continuation of application No. 15/941,546, filed on Mar. 30, 2018, now Pat. No. 10,387,197, which is a continuation of application No. 15/422,159, filed on Feb. 1, 2017, now Pat. No. 9,965,325, which is a continuation of application No. 14/527,017, filed on Oct. 29, 2014, now Pat. No. 9,600,333.

(51) Int. Cl.
*G06F 9/48* (2006.01)
*G06F 9/50* (2006.01)
*G06F 9/44* (2018.01)
*G06F 9/46* (2006.01)
*G06F 9/445* (2018.01)

(52) U.S. Cl.
CPC ............ *G06F 9/4881* (2013.01); *G06F 9/445* (2013.01); *G06F 9/466* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 9/5016* (2013.01); *G06F 9/5061* (2013.01); *G06F 9/5072* (2013.01)

(58) Field of Classification Search
CPC ........ G06F 9/48; G06F 9/4806; G06F 9/4843; G06F 9/4881; G06F 9/50; G06F 9/5005; G06F 9/5011; G06F 9/5016; G06F 9/5061; G06F 9/5072
See application file for complete search history.

(56) References Cited

U.S. PATENT DOCUMENTS

| | | |
|---|---|---|
| 2003/0149717 A1 | 8/2003 | Heinzman |
| 2006/0206894 A1 | 9/2006 | Jung et al. |
| 2006/0218558 A1 | 9/2006 | Torii et al. |
| 2008/0052714 A1 | 2/2008 | Wong |

(Continued)

*Primary Examiner* — Charles M Swift
(74) *Attorney, Agent, or Firm* — Bookoff McAndrews, PLLC

(57) ABSTRACT

Systems and methods for transaction/file-based management of a plurality of processes associated with various jobs are provided. Through the management of discrete applications, a file distribution manager/scheduler orchestrates automated execution of different types of jobs. The processes executed for the various processes can vary based on job type, or other parameters.

20 Claims, 13 Drawing Sheets

(56) References Cited

U.S. PATENT DOCUMENTS

| | | |
|---|---|---|
| 2009/0183162 A1 | 7/2009 | Kindel et al. |
| 2011/0061057 A1 | 3/2011 | Harris et al. |
| 2011/0075596 A1 | 3/2011 | Moreira et al. |
| 2011/0295978 A1 | 12/2011 | Pazos et al. |
| 2012/0221886 A1 | 8/2012 | Barsness et al. |
| 2013/0117752 A1 | 5/2013 | Li et al. |
| 2013/0346988 A1 | 12/2013 | Bruno et al. |
| 2014/0143787 A1 | 5/2014 | Bostic et al. |
| 2014/0282512 A1 | 9/2014 | Pacheco et al. |
| 2014/0282576 A1 | 9/2014 | Grossman et al. |
| 2015/0347178 A1 | 12/2015 | Magee et al. |
| 2017/0357530 A1 | 12/2017 | Shih et al. |

FIG. 9

| Type | Schedule | Enabled | Next Run | Last Run | Id |
|---|---|---|---|---|---|
| Once | At 3:30 PM on 11/14/2012 | False | 11/14/2012 3:31 PM | 11/14/2012 3:31:04 PM -07:00 | 160 |
| Interval | Every 1 Minutes, starting at 10:53 AM on 10/24/2012 | False | 11/8/2012 2:48 PM | 11/8/2012 2:47:06 PM -07:00 | 155 |
| Interval | Every 1 Minutes, starting at 10:54 AM on 10/24/2012 | False | 11/8/2012 2:48 PM | 11/8/2012 2:47:06 PM -07:00 | 156 |
| Daily | At 3:00 PM every 1 day(s), starting 9/27/2012 | False | 11/9/2012 3:00 PM | 11/8/2012 2:46:36 PM -07:00 | 130 |
| Once | At 2:08 PM on 10/23/2012 | False | 10/23/2012 2:08 PM | 10/23/2012 2:08:22 PM -06:00 | 154 |
| Once | At 2:01 PM on 10/23/2012 | False | 10/23/2012 2:05 PM | 10/23/2012 2:05:22 PM -06:00 | 153 |
| Once | At 2:00 PM on 10/23/2012 | False | 10/23/2012 2:00 PM | 10/23/2012 2:00:52 PM -06:00 | 151 |
| Once | At 3:28 PM on 9/27/2012 | False | 9/27/2012 3:28 PM | 9/27/2012 3:28:19 PM -06:00 | 131 |
| Daily | At 2:45 PM every 1 day(s), starting 9/27/2012 | False | 9/28/2012 2:45 PM | 9/27/2012 2:45:07 PM -06:00 | 129 |
| Daily | At 2:22 PM every 1 day(s), starting 9/27/2012 | False | 9/28/2012 2:22 PM | 9/27/2012 2:22:07 PM -06:00 | 127 |
| Daily | At 12:00 PM every 1 day(s), starting 9/27/2012 | False | 9/28/2012 12:00 PM | 9/27/2012 12:00:25 PM -06:00 | 126 |
| Once | At 4:07 PM on 9/25/2012 | False | 9/25/2012 4:07 PM | 9/25/2012 4:07:25 PM -06:00 | 125 |

FIG. 10

Edit Job Definition

Type: Once
☑ Is Enabled?
☐ Run if Missed?
Valid From: 6/14/2013 8:16 AM   To: ☐ 6/14/2013 8:16 AM
Holiday Group: <none>
Parameter Set: Test Job Default Edit Job Schedule Type: Interval ☑ Is Enabled?
☐ Run If Missed?

Valid From: 6/14/2013 8:16 AM   To: 6/14/2013 8:16 AM

Holiday Group: <none>

Interval Options
Recur every 1
Minutes
Hours

Parameter Set: Test Job

Save    Cancel

Edit Job Schedule

Type: Daily

☑ Is Enabled?
☐ Run if Missed?

Valid From: 6/14/2013 8:16 AM    To: ☐ 6/14/2013 8:16 AM

Holiday Group: <none>

Daily Options
Recur every 2 days

Parameter Set: Test Job Default

Save    Cancel

Edit Job Schedule — 760

Type: Weekly
☑ Is Enabled?
☐ Run if Missed?
Valid From: 6/14/2013 8:17 AM    To: ☐ 6/14/2013 8:17 AM
Holiday Group: <none>

Daily Options
Recur every 1 weeks on
☐ Sunday   ☑ Monday   ☐ Tuesday   ☐ Wednesday   ☐ Thursday   ☐ Friday
☑ Saturday Parameter Set: Test Job Default

[Save]   [Cancel]

FIG. 14

SYSTEM AND METHODS FOR TRANSACTION-BASED PROCESS MANAGEMENT

CROSS-REFERENCE TO RELATED APPLICATION(S)

This patent application is a continuation of and claims the benefit of priority to U.S. application Ser. No. 16/503,006, filed Jul. 3, 2019, which is a continuation of and claims the benefit of priority to U.S. application Ser. No. 15/941,546, filed on Mar. 30, 2018, now U.S. Pat. No. 10,387,197, which is a continuation of and claims the benefit of priority to U.S. application Ser. No. 15/422,159, filed on Feb. 1, 2017, now U.S. Pat. No. 9,965,325, which is a continuation of and claims the benefit of priority to U.S. application Ser. No. 14/527,017, filed on Oct. 29, 2014, now U.S. Pat. No. 9,600,333, all of which are incorporated herein by reference in their entireties.

TECHNICAL FIELD

The systems and methods described below relate generally to the field of the automated execution of computer processes.

BACKGROUND

Automated execution of computer processes is desirable for routine and/or repetitive tasks on a computer system. Automating such tasks can be especially advantageous in a networked environment for which the given tasks must be performed. Often, manual execution of such tasks is resource intensive, cumbersome, and unreliable.

SUMMARY

In an embodiment, the present disclosure is directed, in part, to a computer-implemented method of causing execution of at least one computer process on a computing system. The method comprises receiving, by a job management computing system, an indication of a first plurality of processing tasks associated with a first job type, wherein each of the plurality of processing tasks is associated with a respective allocation of processing resources. The method also comprises storing, by the job management computing system, in a data store an association between the first job type and the first plurality of processing tasks. The method also comprises receiving, by the job management computing system, an indication of a second plurality of processing tasks associated with a second job type, wherein each of the plurality of processing tasks is associated with a respective allocation of processing resources, wherein at least one of the first plurality of processing tasks is the same as one of the second plurality of processing tasks. The method also comprises storing, by the job management computing system, in the data store an association between the second job type and the second plurality of processing tasks. The method also comprises grouping, by the job management computing system, the first job type and the second job type into a job grouping, wherein one of the first job type and the second job type can be executed at a time. The method also comprises receiving, by the job management computing system, an electronic file as an initiation of a job. The method also comprises determining, by the job management computing system, a job type of the job based on the electronic file. The method also comprises causing, by the job management computing system, the execution of the first plurality of processing tasks when the job is the first type of job and the second job type is not executing. The method also comprises, causing, by the job management computing system, the execution of the second plurality of processing tasks when the job is the second type of job and the first job type is not executing.

In an embodiment, the present disclosure is directed, in part, to a job management computing system. The job management computing system comprising computer readable medium having instructions stored thereon which when executed by a processor cause the processor to receive an indication of a first plurality of processing tasks associated with a first job type, wherein each of the plurality of processing tasks is associated with a respective allocation of processing resources. The instructions, when executed by a processor also cause the process to store in a data store an association between the first job type and the first plurality of processing tasks. The instructions, when executed by a processor also cause the process to receive an indication of a second plurality of processing tasks associated with a second job type, wherein each of the plurality of processing tasks is associated with a respective allocation of processing resources, wherein at least one of the first plurality of processing tasks is the same as one of the second plurality of processing tasks. The instructions, when executed by a processor also cause the process to store in the data store an association between the second job type and the second plurality of processing tasks, identify an initiation of a transaction and determine a job type of the transaction. The instructions, when executed by a processor also cause the process to group the first job type and the second job type into a job grouping, wherein one of the first job type and the second job type can be executed at a time. The instructions, when executed by a processor also cause the process to, cause the execution of the first plurality of processing tasks when the transaction is the first type of transaction and the second job type is not executing. The instructions, when executed by a processor also cause the process to, cause the execution of the second plurality of processing tasks when the transaction is the second type of transaction and the first job type is not executing.

In an embodiment, the present disclosure is directed, in part, to a job management computing system. The job management computing system comprises means for receiving an indication of a first plurality of processing tasks associated with a first job type, wherein each of the plurality of processing tasks is associated with a respective allocation of processing resources. The job management computing system comprises means for storing in a data store an association between the first job type and the first plurality of processing tasks. The job management computing system comprises means for receiving an indication of a second plurality of processing tasks associated with a second job type, wherein each of the plurality of processing tasks is associated with a respective allocation of processing resources, wherein at least one of the first plurality of processing tasks is the same as one of the second plurality of processing tasks. The job management computing system comprises means for storing in the data store an association between the first job type and the first plurality of processing tasks. The job management computing system comprises means for grouping the first job type and the second job type into a job grouping, wherein one of the first job type and the second job type can be executed at a time. The job management computing system comprises means for identifying an initiation of a transaction. The job management computing system comprises means for determining a job type of the transaction. The job management computing system comprises means for causing the execution of the first plurality of processing tasks when the transaction is the first type of transaction and the second job type is not executing. The job management computing system comprises means for causing the execution of the second plurality of processing tasks when the transaction is the second type of transaction and the first job type is not executing.

BRIEF DESCRIPTION OF THE DRAWINGS

FIG. 9 depicts an example scheduling interface for adding or editing a job's schedule.

FIG. 10 depicts an edit schedule window for a first schedule type.

FIG. 11 depicts an edit schedule window for a second schedule type.

FIG. 12 depicts an edit schedule window for a third schedule type.

FIG. 13 depicts an edit schedule window for a fourth schedule type.

FIG. 14 depicts an edit schedule window for a fifth schedule type.

DETAILED DESCRIPTION

Figure 1:
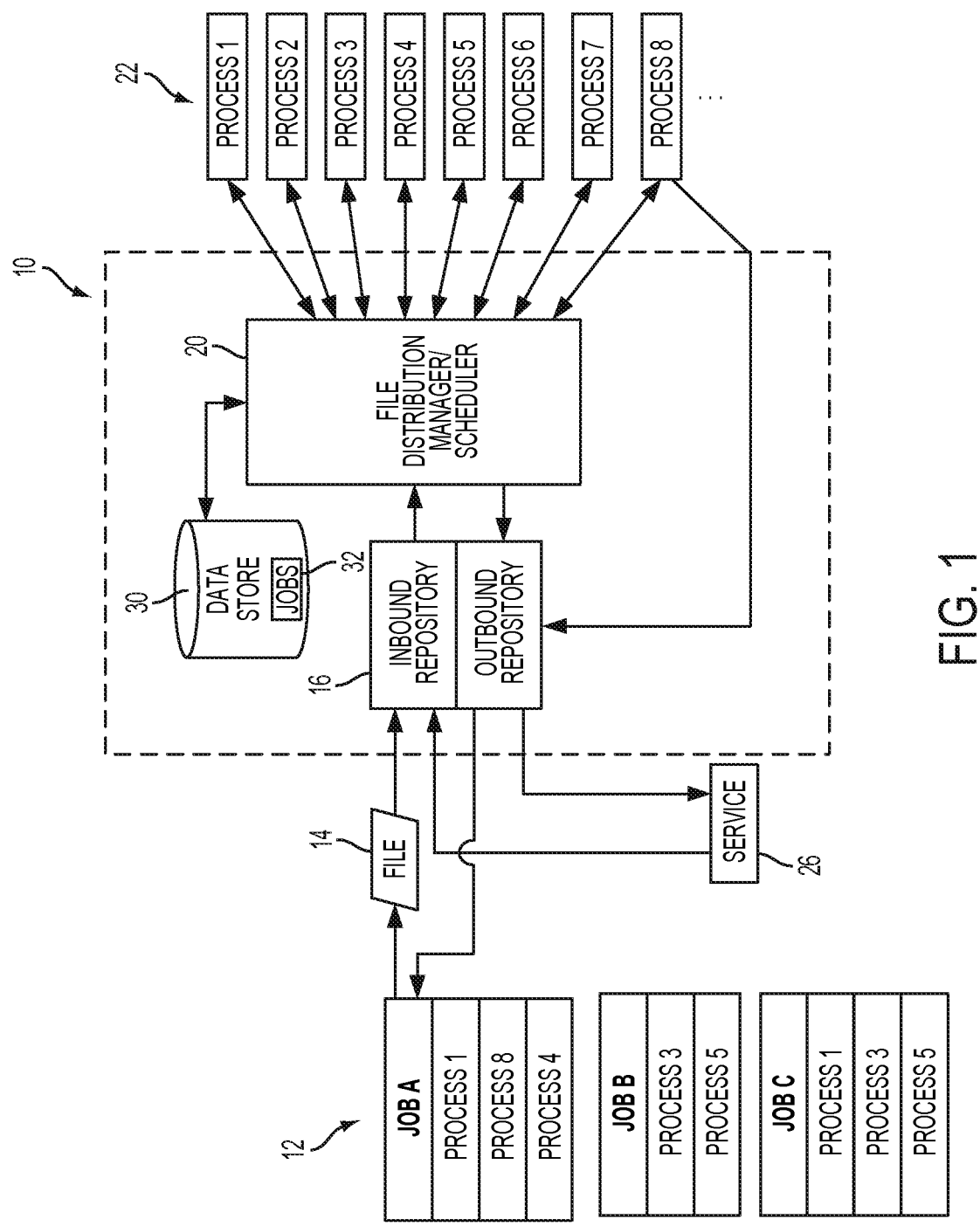
FIG. 1 depicts a block diagram of an example job management computing system in accordance with one non-limiting embodiment.

Various non-limiting embodiments of the present disclosure will now be described to provide an overall understanding of the principles of the structure, function, and use of systems and methods disclosed herein for the automated management of jobs in a computing environment. One or more examples of these non-limiting embodiments are illustrated in the selected examples disclosed and described in detail with reference made to FIGS. 1-15 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

FIG. 1 depicts a block diagram of an example job management computing system 10 in accordance with one non-limiting embodiment. The job management computing system 10 can include a file distribution manager/scheduler 20 that generally loads and manages various business processes, shown as jobs 12. A job can generally be defined as a sequence of structured or semi-structured tasks that are performed in series or in parallel by two or more applications to reach a common goal. The applications can be executed on computing systems that are generally local to the job management computing system 10, or the applications can be executed by third party service providers or other entities that are in electronic communication with the job management computing system 10. In any event, a job is a sequence of processes or tasks indicating the plurality of things that must be accomplished. One task alone does not necessarily constitute a job. The sequence of tasks is structured or semi-structured such that there is some logic to a process and, accordingly, the tasks are not performed on a purely ad hoc basis. The tasks can be performed in series or in parallel based upon the logic of the job and as controlled by the file distribution manager/scheduler 20, as described in more detail below. In the context of computing systems associated with prepaid payment vehicle space, example jobs can generate prepaid payment cards for a particular list of cardholders supplied by a customer, load funds onto a plurality of prepaid payment cards, and so forth.

As shown in FIG. 1, different types of jobs 12 can be characterized by various processes that are performed either in parallel or in sequence to achieve a certain goal. Merely for the purposes of illustration, Job A is characterized by the execution of process 1, process 7 and process 8; Job B is characterized by the execution of process 3 and process 5; and Job C is characterized by the execution of process 1, process 3 and process 5. The association of the jobs to affiliated processes can be stored in a data store 30 of the job management computing system 10, as depicted by the jobs data 32. While Job A, Job B and Job C are shown in FIG. 1, it is to be appreciated that hundreds or even thousands of different types of jobs, as defined by their processes, can be stored by the job management computing system 10.

A file 14 is shown being electronically submitted to an inbound repository 16. As schematically shown in FIG. 1, the file 14 is associated with Job A. The transmission of the file 14 to the job management computing system 10 can initiate processing and can be any suitable type of file, such as a text file, a comma separated value file, an extensible markup language file, and so forth. In the context of automated prepaid payment card generation, for example, the file 14 can include cardholder names, card holder social security numbers, or other information needed to perform the card generation, or at least as an input to one of the processes of the job. The file 14 can be submitted through any suitable interface allowing for electronic communication. One example merchant interface is provided via a web-based portal.

Based on a characteristic, attribute or metadata of the file 14, such as a file type, a naming convention, and/or metadata, the file distribution manager/scheduler 20 can ascertain the type of job to be performed. In the illustrated embodiment, the file distribution manager/scheduler 20 determines that Job A is to be performed. The submission of the file 14 to an inbound repository 16 begins the job process and the file distribution manager/scheduler 20 then manages the subsequent processing such that all of the required processes (i.e., processes 1, 7 and 8) are executed to perform the desired outcome associated with Job A. For pedagogical purposes, Job A will be described in the context of a prepaid card creation job. As such, the file 14 comprises information germane to creating prepaid cards for a plurality of cardholders, such as a cardholder names, social security numbers, birthdays, addresses, and so forth.

Upon receiving the file 14 and determining the appropriate processing for the data included in the file, the file distribution manager/scheduler 20 causes the execution of process 1. Depending on the availability of the resources associated with process 1, or based on a schedule, the file distribution manager/scheduler 20 can optionally wait to execute the process 1 associated with Job A. Process 1 in the illustrated embodiment generates a plurality of unique payment card numbers, with each payment card number associated with an individual identified in the file 14. Depending on the type of process needing to be performed, the process can be performed by any suitable computing system and/or application.

Next, now that that payment card numbers have been generated by process 1, the next process of Job A is called, as stored in the data store 30. In the illustrated embodiment, the next process of Job A is process 8. Process 8 can be, for example, the generation of card security codes (CSC) or card verification data (CVD) for each of the prepaid payment cards being created by Job A. For this process, services are required from a third party, schematically shown as service 26. Process 8 can put a file in the outbound repository 18. The file distribution manager/scheduler 20 can then route the file to the appropriate service 26, such as a card security code generation service, through any suitable messaging protocol. Upon performing the requested processing, the service 26 can return a file, or other data, to the inbound repository 16 job management computing system 10.

Upon receiving the data from the service 26, the file distribution manager/scheduler 20 can then cause the execution of the final process for Job A, which is illustrated as process 4. Process 4 can be, for example, the job that leads to the creation of the physical payment cards. As such, process 4 can transmit information (i.e., the payment card numbers, the cardholder names, the card security codes) to a card production facility.

As described by the foregoing operational example, the file distribution manager/scheduler 20 generally allows for transaction/file-based management of a plurality of processes associated with various jobs. Through this management of discrete applications, the file distribution manager/scheduler 20 can orchestrate automated execution of a large number of different types of jobs. The processes executed for the various processes can vary based on job type, or other parameters. For example, in some embodiments, the file distribution manager/scheduler 20 can call for the execution of a second job upon the successful completion of a first job. In some embodiments, the file distribution manager/scheduler 20 can call for the execution of a job based on a temporal parameter (i.e, based on a schedule). The file distribution manager/scheduler 20 can call for the execution of a job based on a manual input from an operator of a computing system associated with the file distribution manager/scheduler 20. In some embodiments, various processes or applications can call for sub-routines or processes. Such sub-routines can be generally independent of the file distribution manager/scheduler 20 or the file distribution manager/scheduler 20 can participate in the scheduling and execution of such sub-routines.

In some embodiments, certain jobs can be assigned to a group. The file distribution manager/scheduler 20 can be configured such that only one job in a particular group can execute at a time. If one job in a group is running, and other jobs in the group are scheduled, they wait until the group's running job completes. In these configurations, if multiple jobs need to access the same data in a database, or other shared resources, they will not all be attempting to access the data at the same time.

Figure 2:
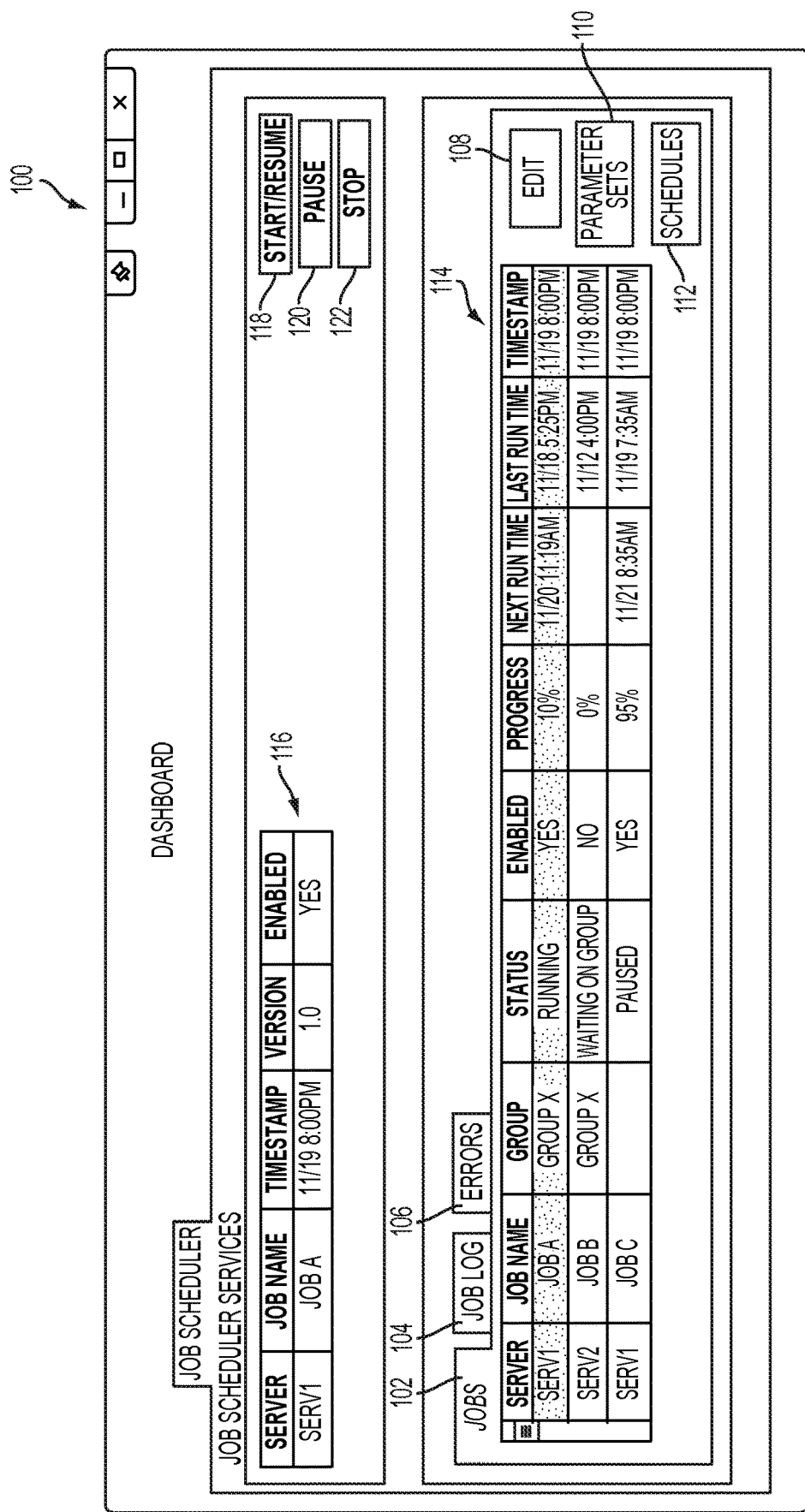
FIG. 2 depicts an example user interface displaying a dashboard for managing jobs in accordance with one non-limiting embodiment.

FIG. 2 depicts an example user interface displaying a dashboard 100 for managing jobs (such as Jobs A, B and C shown in FIG. 1) in accordance with one non-limiting embodiment. The dashboard 100, or at least content for the dashboard, can be generated by the job management computing system 10. While an example dashboard 100 is depicted in FIG. 2, the particular layout and content of the dashboard 100 can vary without departing from the scope of the present disclosure. The dashboard 100 can provide an operator with a variety of job-related information to assist with the management and execution of a large number of jobs. For the purposes of illustration, however, the dashboard 100 is depicted in a simplified format.

Under the jobs tab 102, a job list 114 is provided which identifies the jobs loaded into the file distribution manager/scheduler 20. Data for the job list 114 can be pulled from, for example, the jobs data 32 in data store 30 (FIG. 1). In the illustrated embodiment, the "server" column indicates a server that is controlling the job is loaded. The "job name" column indicates the name of the job, which can be provided by an operator during establishment of the job. The "group" column indicates if the job is has been assigned to a group. The "status" column indicates the current status of the job. In one embodiment, example statuses include unknown (i.e., during service startup), not running, running, waiting on group, and paused. The "enabled" column indicates if a job is be scheduled by the file distribution manager/scheduler 20. For example, if set to "true," the job can be scheduled and ran; otherwise, the job will not run even if scheduled. In some embodiments, the job can be run manually regardless of the value in the "enabled" column. The "progress" column provides an indication of the job's progress, which can be reported by the job itself. The "next run time" indicates if the job is scheduled to run. If there are any schedules that will run job, the time indicated in the "next run time" column is the next time it will be ran based on schedule. The "last run time" column indicates the last time the job ran, either scheduled or manual. The "timestamp" column indicates when the job status was last updated.

Figure 3:
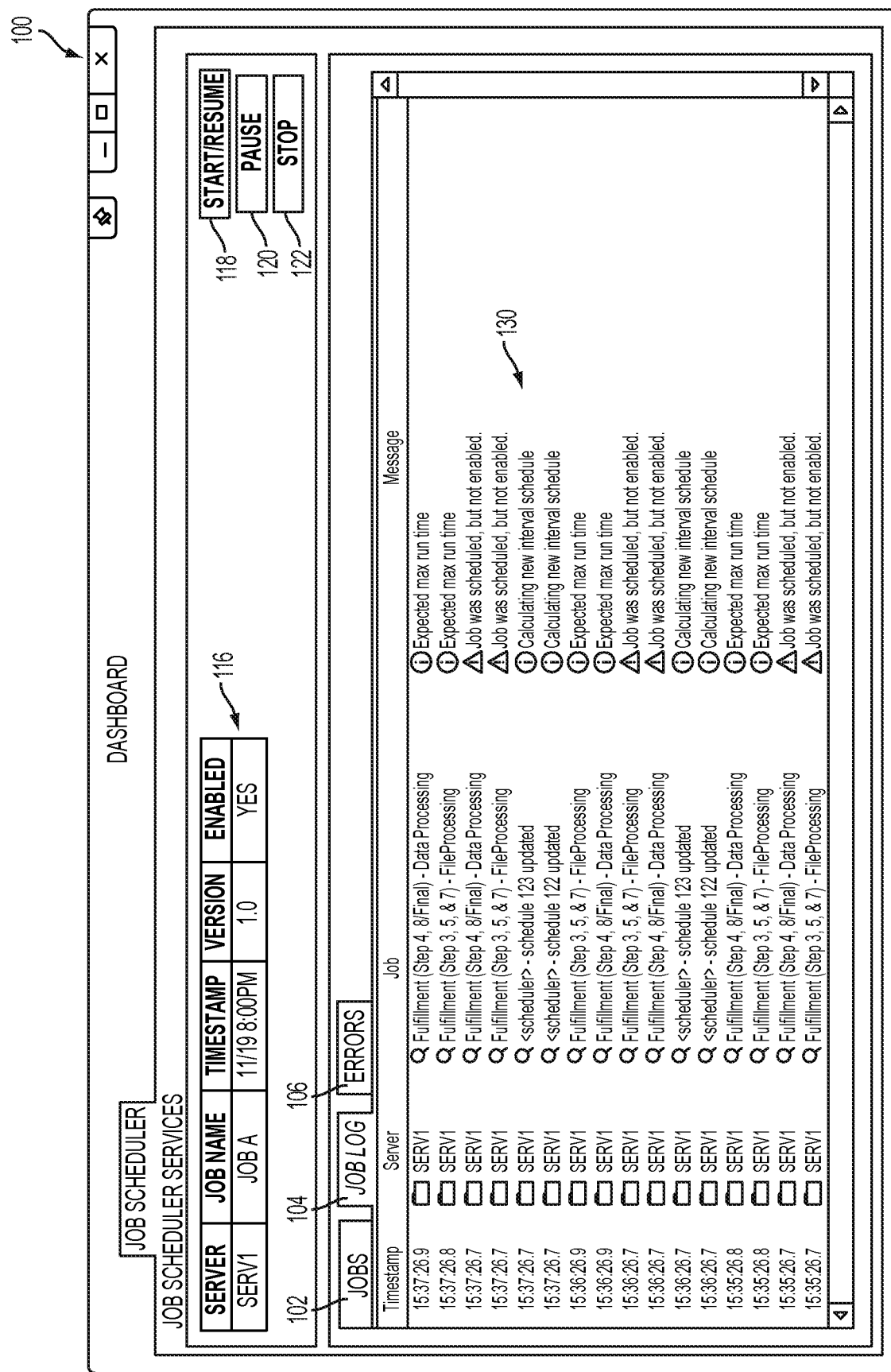
FIG. 3 depicts an example job log that can be displayed on a dashboard.
Figure 4:
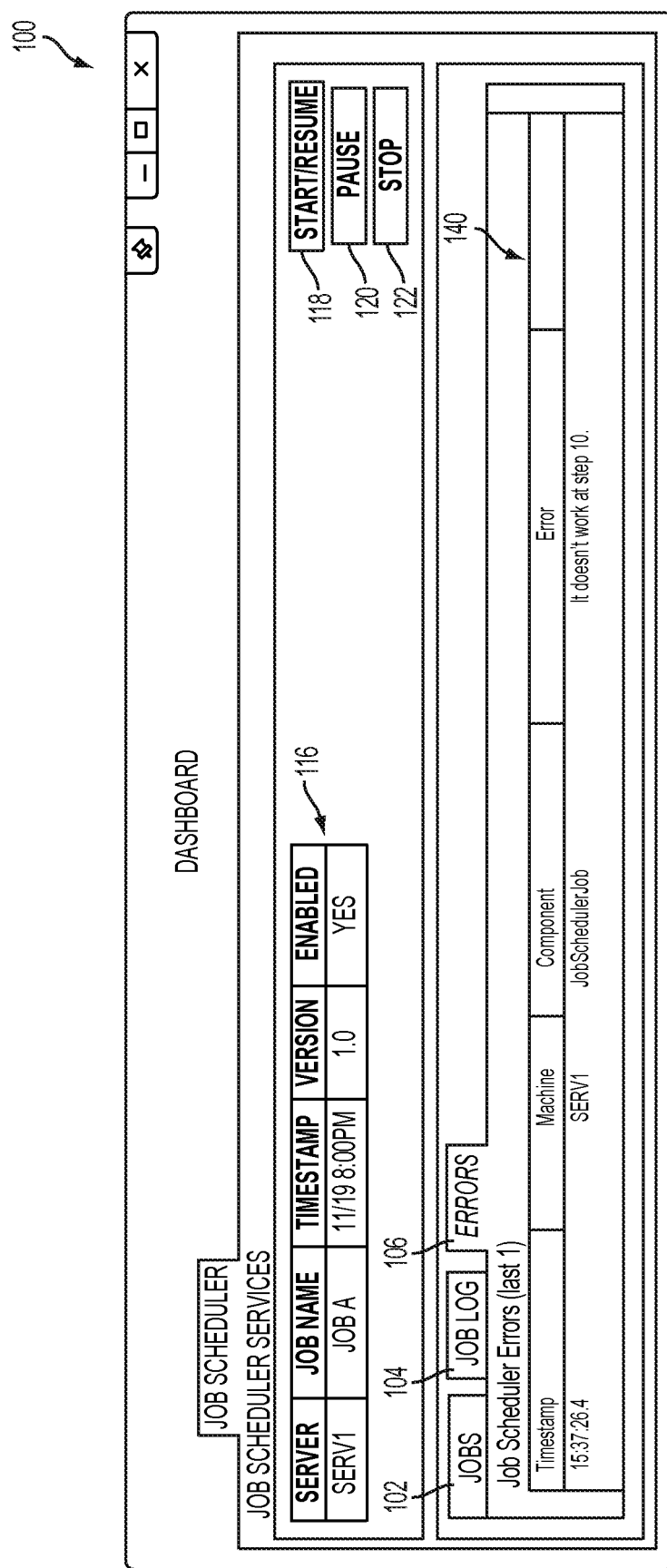
FIG. 4 depicts an example error log that can be displayed on a dashboard.

FIG. 3 depicts an example job log 130 that can be displayed on the dashboard 100 upon selection of the job log tab 104. The jog log 130 can show, in substantially real-time, log messages generated by jobs. The entries can be double-clicked to see more detail. For example, if the message "job was scheduled, but not enabled" is selected by the operator, the dashboard 100 can refer the operator to an interface in which the "enabled" flag for that particular job is presented so that the flag can be changed from "no" to "yes." FIG. 4 depicts an example error log 140 that can be displayed on the dashboard 100 upon selection of the error tab 104.

Referring again to FIG. 2, Job A is shown highlighted on the job list. Additional job-related functionally is accessible through the dashboard 100 through selection or activation of an edit control feature 108, a parameter sets control feature 110, and a schedules control feature 112. Additionally, as shown in the job scheduler services listing 116, additional control can be offered to the operator to manually manage running a job by way of a start/resume control feature 118, a pause control feature 120 and a stop control feature 122. Activation of various control features are described in more detail below.

Figure 5:
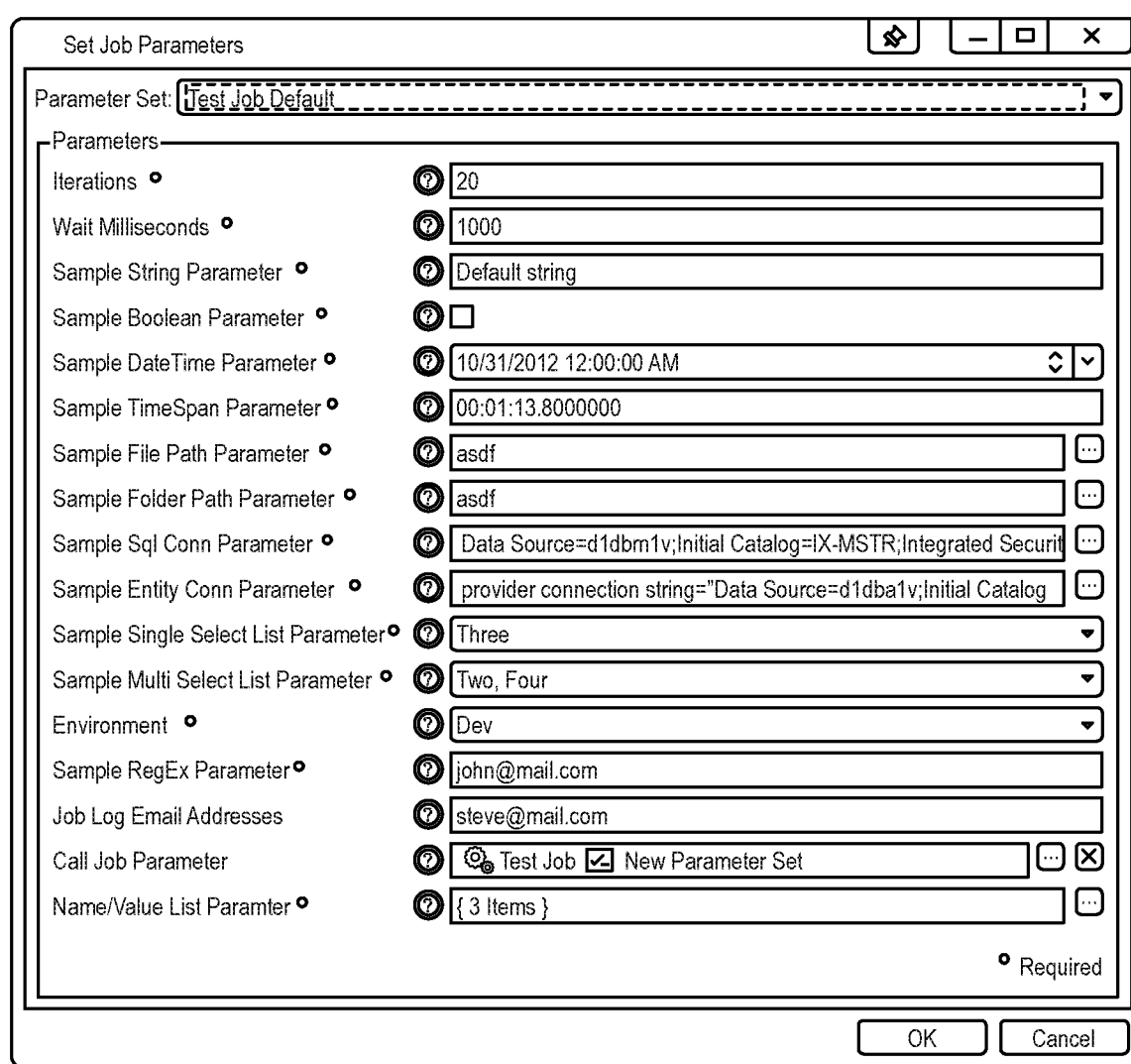
FIG. 5 depicts an example parameter set for an example job.

In some embodiments, clicking on or otherwise selecting the start/resume control feature 118 will start the job if it is not running, or resume the job if is it paused. If the job is not running, a graphical display of a parameter set associated with the job can be displayed. Referring to FIG. 5, an example parameter set 200 for an example job, shown as "Test Job Default," is illustrated. The value for the various parameters can be stored in the data store 30 and utilized by the file distribution manager/scheduler 20 during the execution of the job. The parameter set 200 can be populated with the job's configured default parameters. Some parameters may be required parameters and must be set to run the job. As parameters are entered by an operator, the parameters can be validated by the job management computing system 10. For example, if an invalidly formatted email address is entered in the "Sample RegEx Parameter" field, an error will be displayed. Once the parameters are entered, or otherwise approved by the operator, the job will be run using the parameter set.

Referring again to FIG. 2, the pause control feature 120 can be enabled if the selected job is running. Activation of the pause control feature 120 will pause the selected job, if it was written to be pausable. Activation of the stop control feature 122 will stop the selected job.

Figure 6:
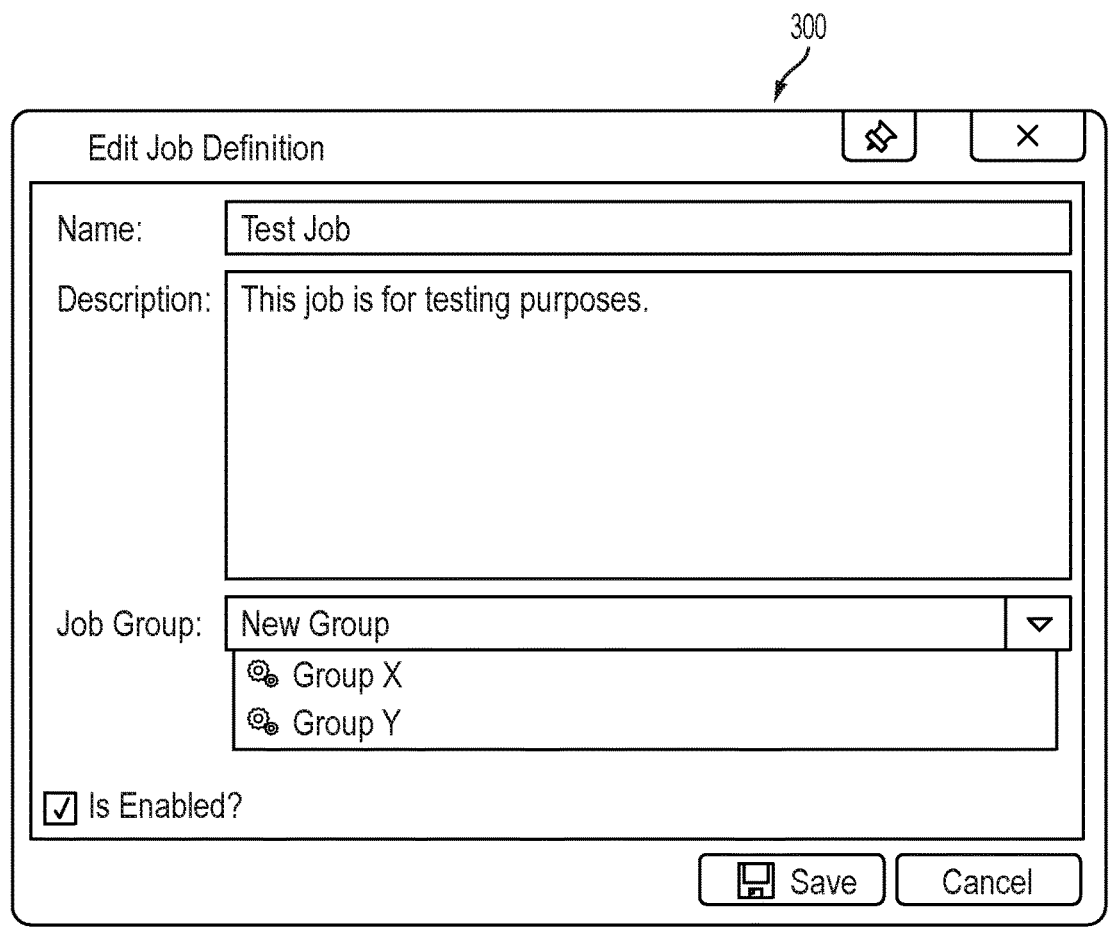
FIG. 6 depicts an example edit job definition window for an example job.

Activating the edit control feature 108 allows the selected job definition to be altered. FIG. 6 depicts an example edit job definition window 300 that can be displayed to an operator. Through interactions with this window 300, the job can be enabled/disabled and the default parameters can be configured. The job can also be added to an existing group, shown as Group X and Group Y, or a new job group can be created.

Figure 7:
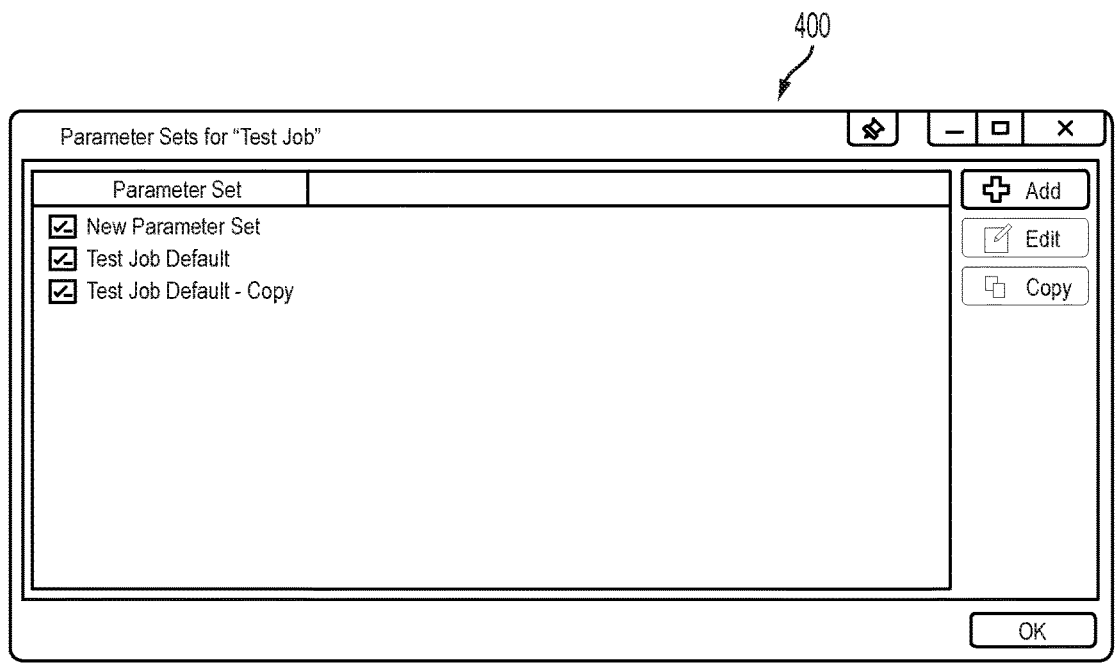
FIG. 7 depicts an example parameter sets window illustrating a plurality of parameter sets associated with an example job.
Figure 8:
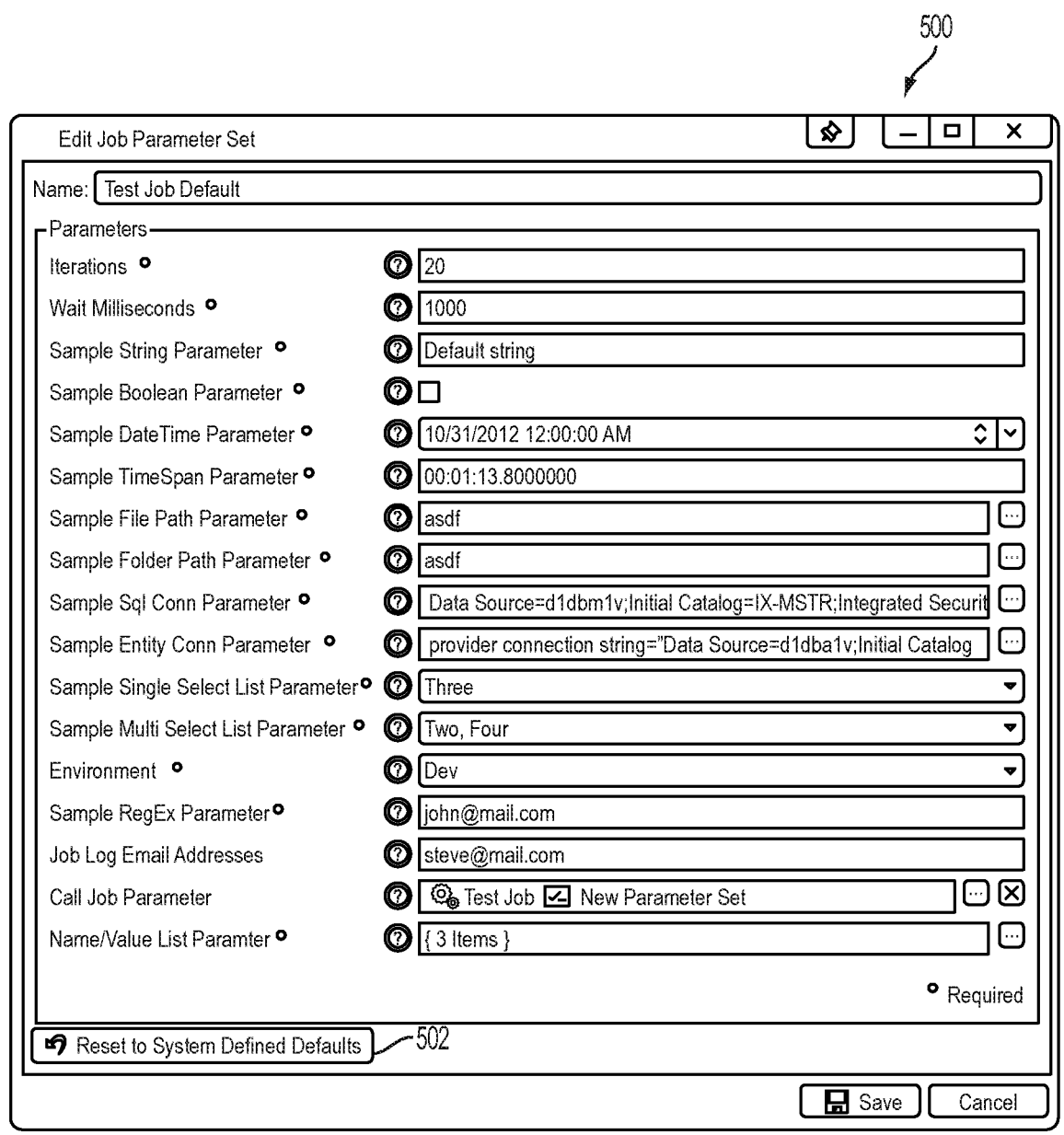
FIG. 8 depicts an edit job parameter set window to edit a plurality of parameter sets associated with an example job.

In some embodiments, a job can have multiple sets of parameters, each of which can be scheduled independently. FIG. 7 depicts an example parameter sets window 400 illustrating a plurality of parameter sets associated with an example job. Each parameter set can be edited, as depicted by the edit job parameter set window 500 in FIG. 8. In some embodiments, a reset to system defined defaults control feature 502 can be provided to the operator.

Figure 14:
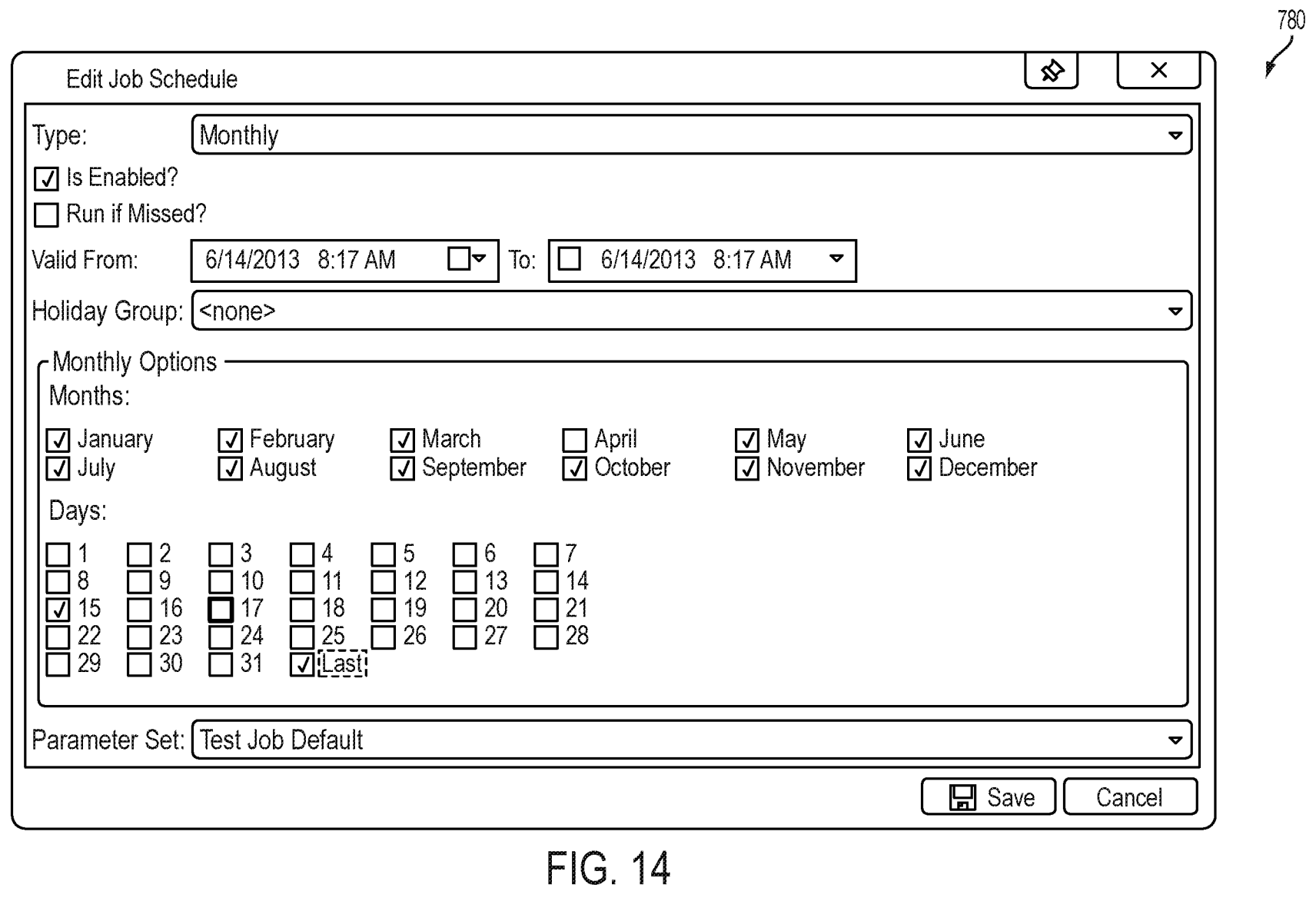

Referring against to FIG. 2, activation of schedules control feature 112 can allow an operator to configure the selected job's schedules. FIG. 9 depicts an example scheduling interface 600 for adding or editing a job's schedule. In one embodiment, there are a variety of schedule types, such as once, interval, daily, weekly, and monthly. The schedules can have various properties. FIGS. 10-14 depict the edit schedule windows for a variety of example schedules which can be displayed to the operator upon the selection of the edit control feature 602 depicted in FIG. 9. FIG. 10 depicts an edit schedule window 700 for a "once" schedule type. FIG. 11 depicts an edit schedule window 720 for an "interval" schedule type. FIG. 12 depicts an edit schedule window 740 for a "daily" schedule type. FIG. 13 depicts an edit schedule window 760 for a "weekly" schedule type. FIG. 14 depicts an edit schedule window 780 for a "monthly" schedule type.

Referring now to the edit schedule window 700 for a "once" schedule type of FIG. 10, a one-time schedule can be created to run the job at a specific time, and then the schedule will be disabled. Referring now to the edit schedule window 720 for an "interval" schedule type of FIG. 11, an interval schedule can run a job on an interval of seconds, minutes, or other temporal interval. Referring now to the edit schedule window 740 for a "daily" schedule type of FIG. 12, a daily schedule will run a job at the same time of day, recurring for a certain number of days. Referring now to the edit schedule window 760 for a "weekly" schedule type of FIG. 13, a weekly schedule can be configured to run a job on certain days of the week, at the same time of day, and recurring for a specified number of days. Referring now to the edit schedule window 780 for a "monthly" schedule type of FIG. 14, a monthly schedule will run a job in specified months, specified days of the month, at the same time of day.

In the illustrated embodiments, each schedule can be enabled or disabled, as indicated by a selection of an "is enabled?" control feature. The schedules can also be configured so that if a job did not run on schedule because the service was down, it will run as soon as the file distribution manager/scheduler 20 evaluates the status and detects the "next run time" is in the past. Each schedule can optionally be provided with a "valid from" date to indicate the start time of the schedule. For Once, Daily, Weekly, and Monthly schedules, the time of day will be used to run the schedule's job. Each schedule can be provided with a "valid to" day to indicate a date and time when the schedule will automatically be disabled. In some embodiments, a selection of a particular holiday group can be selected to identify a list of holidays on which to skip running the schedule's job. Finally, the "parameter set" of the schedule indicates a specific parameter set to use when scheduling a job.

In some embodiments, a job cannot run more than once at a time. Since a job can have multiple schedules, however, it is possible that the schedules would cause a job to start again while it is still running from a previous schedule. The file distribution manager/scheduler 20 can mitigate this situation by evaluating which particular parameter set is being used in the current run of the job. If the job is scheduled to run again with the same parameter set as the current run, the new run can be discarded. If the job is scheduled to run again with a different parameter set than the current run, the new run can be queued and will start when the current run completes.

Figure 15:
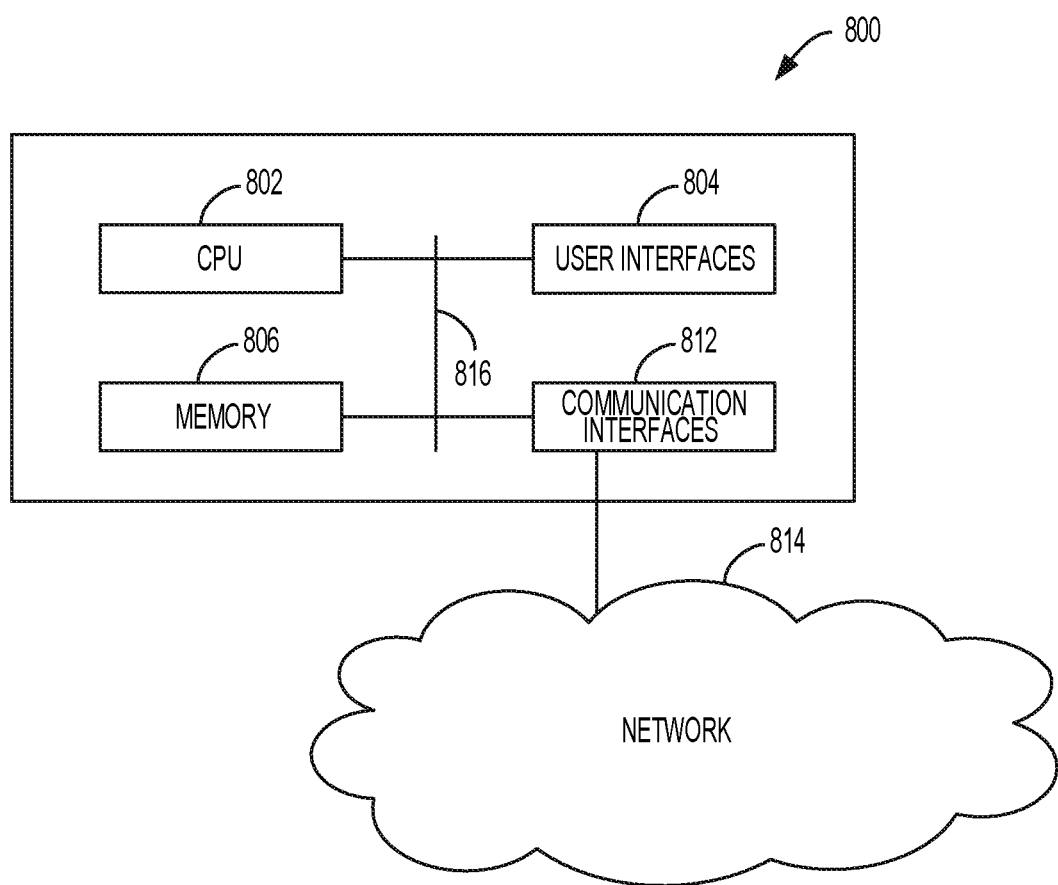
FIG. 15 depicts example computing device.

The processes described above can be performed on or between one or more computing devices. Referring now to FIG. 15, an example computing device 800 is presented. A computing device 800 can be a server, a computing device that is integrated with other systems or subsystems, a mobile computing device, a cloud-based computing capability, and so forth. The computing device 800 can be any suitable computing device as would be understood in the art, including without limitation, a custom chip, an embedded processing device, a tablet computing device, the job management computing system 10, any computing system associated with the file distribution manager/scheduler 20, a computer system associated with the service 26, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 800 includes a processor 802 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 800 also includes one or more memories 806, for example read only memory (ROM), random access memory (RAM), cache memory associated with the processor 802, or other memories such as dynamic RAM (DRAM), static ram (SRAM), programmable ROM (PROM), electrically erasable PROM (EEPROM), flash memory, a removable memory card or disk, a solid state drive, and so forth. The computing device 800 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or Blu-Ray disk, and so forth. Storage media such as flash drives, solid state hard drives, redundant array of individual disks (RAID), virtual drives, networked drives and other memory means including storage media on the processor 802, or memories 806 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 808 can be configured to transmit to, or receive data from, other computing devices 800 across a network 812. The network and communication interfaces 808 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 808 can include wired data transmission links such as Ethernet and TCP/IP. The communication interfaces 808 can include wireless protocols for interfacing with private or public networks 812. For example, the network and communication interfaces 808 and protocols can include interfaces for communicating with private wireless networks 812 such as a Wi-Fi network, one of the IEEE 802.11x family of networks, or another suitable wireless network. The network and communication interfaces 808 can include interfaces and protocols for communicating with public wireless networks 812, using for example wireless protocols used by cellular network providers, including Code Division Multiple Access (CDMA) and Global System for Mobile Communications (GSM). A computing device 800 can use network and communication interfaces 808 to communicate with hardware modules such as a database or data store, or one or more servers or other networked computing resources. Data can be encrypted or protected from unauthorized access.

In various configurations, the computing device 800 can include a system bus 810 for interconnecting the various components of the computing device 800, or the computing device 800 can be integrated into one or more chips such as programmable logic device or application specific integrated circuit (ASIC). The system bus 810 can include a memory controller, a local bus, or a peripheral bus for supporting input and output devices 804, and communication interfaces 808. Example input and output devices 804 include keyboards, keypads, gesture or graphical input devices, motion input devices, touchscreen interfaces, one or more displays, audio units, voice recognition units, vibratory devices, computer mice, and any other suitable user interface.

The processor 802 and memory 806 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method of causing execution of at least one computer process on a computing system, the method comprising:
   receiving, by a job management computing system, an indication of a first plurality of processing tasks associated with a first job of a first job type;
   receiving, by the job management computing system, an indication to initiate the first job of the first job type;
   receiving, by the job management computing system, a first plurality of parameters associated with the first job;
   prompting, by the job management computing system, execution of the first plurality of processing tasks;
   receiving, by the job management computing system, an indication of a second plurality of processing tasks associated with a second job of a second job type;
   receiving, by the job management computing system, an indication to initiate the second job of the second job type;
   receiving, by the job management computing system, a second plurality of parameters associated with the second job;
   determining, by the job management computing system, that the first job type is the same as the second job type;
   displaying an edit control feature of the job management computing system, the edit control feature indicating one or more of: the first job of the first job type, the second job of the second job type, the first plurality of parameters, the second plurality of parameters, a first allocation of processing resources associated with the first job, and a second allocation of processing resources associated with the second job;
   receiving, from the edit control feature, one or more changes to a set of parameters comprising the first plurality of parameters and the second plurality of parameters, wherein the one or more changes remove one or more processing resources in common; and
   upon receiving the one or more changes to the set of parameters, executing, by the job management computing system, the first plurality of processing tasks and the second plurality of processing tasks.

2. The computer-implemented method of claim 1, wherein the first plurality of processing tasks comprises a first processing task, a second processing task, and a third processing task, wherein prompting, by the job management computing system, the execution of the first plurality of processing tasks comprises:
   prompting one of the first processing task, the second processing task, and the third processing task to be executed based on a real-time availability of processing resources.

3. The computer-implemented method of claim 1, wherein the first plurality of processing tasks identifies a sequence of processing tasks, and wherein prompting, by the job management computing system, the execution of the first plurality of processing tasks comprises:
   prompting each of the first plurality of processing tasks to be sequentially completed based on the identified sequence.

4. The computer-implemented method of claim 1, wherein determining, by the job management computing system, that the first job type is the same as the second job type is based on a naming convention of an associated electronic file.

5. The computer-implemented method of claim 1, wherein executing, by the job management computing system, the first plurality of processing tasks and the second plurality of processing tasks comprises:
   delaying the execution of the second plurality of processing tasks until after a completion of the first plurality of processing tasks; and
   monitoring a status of the first plurality of processing tasks.

6. The computer-implemented method of claim 5, comprising:
   monitoring, by the job management computer, a status of the second plurality of processing tasks during the monitoring of the status of the first plurality of processing tasks.

7. The computer-implemented method of claim 1, wherein the one or more changes are made to one or more temporal parameters of the set of parameters.

8. The computer-implemented method of claim 1, wherein the one or more processing resources in common include one or more processing resources shared between the first allocation of processing resources associated with the first job and the second allocation of processing resources associated with the second job.

9. A job management computing system, the job management computing system comprising a non-transitory computer readable medium having instructions stored thereon which when executed by at least one processor cause the at least one processor to execute a method comprising:
    receiving, by the job management computing system, an indication of a first plurality of processing tasks associated with a first job of a first job type;
    receiving, by the job management computing system, an indication to initiate the first job of the first job type;
    receiving, by the job management computing system, a first plurality of parameters associated with the first job;
    prompting, by the job management computing system, execution of the first plurality of processing tasks;
    receiving, by the job management computing system, an indication of a second plurality of processing tasks associated with a second job of a second job type;
    receiving, by the job management computing system, an indication to initiate the second job of the second job type;
    receiving, by the job management computing system, a second plurality of parameters associated with the second job;
    determining, by the job management computing system, that the first job type is the same as the second job type;
    displaying an edit control feature of the job management computing system, the edit control feature indicating one or more of: the first job of the first job type, the second job of the second job type, the first plurality of parameters, the second plurality of parameters, a first allocation of processing resources associated with the first job, and a second allocation of processing resources associated with the second job;
    receiving, from the edit control feature, one or more changes to a set of parameters comprising the first plurality of parameters and the second plurality of parameters, wherein the one or more changes remove one or more processing resources in common; and
    upon receiving the one or more changes to the set of parameters, executing, by the job management computing system, the first plurality of processing tasks and the second plurality of processing tasks.

10. The job management computing system of claim 9, wherein the first plurality of processing tasks comprises a first processing task, a second processing task, and a third processing task, wherein prompting, by the job management computing system, the execution of the first plurality of processing tasks comprises:
    prompting one of the first processing task, the second processing task, and the third processing task to be executed based on a real-time availability of processing resources.

11. The job management computing system of claim 9, wherein the first plurality of processing tasks identifies a sequence of processing tasks, and wherein prompting, by the job management computing system, the execution of the first plurality of processing tasks comprises:
    prompting each of the first plurality of processing tasks to be sequentially completed based on the identified sequence.

12. The job management computing system of claim 9, wherein executing, by the job management computing system, the first plurality of processing tasks and the second plurality of processing tasks comprises:
    delaying the execution of the second plurality of processing tasks until after a completion of the first plurality of processing tasks; and
    monitoring a status of the first plurality of processing tasks.

13. The job management computing system of claim 12, wherein the method further comprises:
    monitoring, by the job management computing system, a status of the second plurality of processing tasks during the monitoring of the status of the first plurality of processing tasks.

14. The job management computing system of claim 9, wherein the one or more changes are made to one or more temporal parameters of the set of parameters.

15. The job management computing system of claim 9, wherein determining that the first job type is the same as the second job type is based on a naming convention of an associated electronic file.

16. The job management computing system of claim 9, wherein the one or more processing resources in common include one or more processing resources shared between the first allocation of processing resources associated with the first job and the second allocation of processing resources associated with the second job.

17. A non-transitory computer readable medium comprising instructions stored thereon, wherein the instructions, when executed by at least one processor, cause the at least one processor to perform a method comprising:
    receiving, by a job management computing system, an indication of a first plurality of processing tasks associated with a first job of a first job type;
    receiving, by the job management computing system, an indication to initiate the first job of the first job type;
    receiving, by the job management computing system, a first plurality of parameters associated with the first job;
    prompting, by the job management computing system, execution of the first plurality of processing tasks;
    receiving, by the job management computing system, an indication of a second plurality of processing tasks associated with a second job of a second job type;
    receiving, by the job management computing system, an indication to initiate the second job of the second job type;
    receiving, by the job management computing system, a second plurality of parameters associated with the second job;
    determining, by the job management computing system, that the first job type is the same as the second job type;
    displaying an edit control feature of the job management computing system, the edit control feature indicating one or more of: the first job of the first job type, the second job of the second job type, the first plurality of parameters, the second plurality of parameters, a first allocation of processing resources associated with the first job, and a second allocation of processing resources associated with the second job;
    receiving, from the edit control feature, one or more changes to a set of parameters comprising the first plurality of parameters and the second plurality of parameters, wherein the one or more changes remove one or more processing resources in common; and
    upon receiving the one or more changes to the set of parameters, executing, by the job management computing system, the first plurality of processing tasks and the second plurality of processing tasks.

18. The non-transitory computer readable medium of claim 17, wherein the first plurality of processing tasks identifies a sequence of processing tasks, and wherein prompting, by the job management computing system, the execution of the first plurality of processing tasks comprises:

prompting each of the first plurality of processing tasks to be sequentially completed based on the identified sequence.

19. The non-transitory computer readable medium of claim 17, wherein the one or more changes are made to one or more temporal parameters of the set of parameters.

20. The non-transitory computer readable medium of claim 17, wherein the one or more processing resources in common include one or more processing resources shared between the first allocation of processing resources associated with the first job and the second allocation of processing resources associated with the second job.

\* \* \* \* \*